US012679299B2

(12) United States Patent
Seibt

(10) Patent No.: US 12,679,299 B2
(45) Date of Patent: Jul. 14, 2026

(54) VEHICLE, IN PARTICULAR A CONVERTIBLE

(71) Applicant: Bayerische Motoren Werke Aktiengesellschaft, Munich (DE)

(72) Inventor: Klaus Seibt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 246 days.

(21) Appl. No.: 18/721,339

(22) PCT Filed: Feb. 15, 2023

(86) PCT No.: PCT/EP2023/053758
§ 371 (c)(1),
(2) Date: Jun. 18, 2024

(87) PCT Pub. No.: WO2023/156456
PCT Pub. Date: Aug. 24, 2023

(65) Prior Publication Data
US 2026/0152141 A1 Jun. 4, 2026

(30) Foreign Application Priority Data
Feb. 18, 2022 (DE) ..................... 10 2022 103 930.7

(51) Int. Cl.
B60R 21/13 (2006.01)
(52) U.S. Cl.
CPC ........ B60R 21/13 (2013.01); *B60R 2021/135* (2013.01)
(58) Field of Classification Search
CPC .............. B60R 21/13; B60R 2021/135; B60R 2021/134; B60R 2021/132
USPC ....................................................... 280/756
See application file for complete search history.

(56) References Cited

U.S. PATENT DOCUMENTS

| | | | | |
|---|---|---|---|---|
| 5,655,791 | A | * | 8/1997 | Nowack .................. B60R 21/13 297/410 |
| 7,540,535 | B2 | * | 6/2009 | Kasubke ................. B60R 21/13 280/756 |
| 2003/0205891 | A1 | * | 11/2003 | Nass ........................ B60R 21/13 280/756 |

FOREIGN PATENT DOCUMENTS

| | | | | | |
|---|---|---|---|---|---|
| DE | 4209094 | A1 | * | 9/1993 | ............. B60R 21/13 |
| DE | 196 44 877 | C1 | | 7/1997 | |
| DE | 19750457 | A1 | * | 6/1999 | ............. B60R 21/13 |
| DE | 10300790 | B3 | * | 5/2004 | ............. B60R 21/13 |
| DE | 102006001579 | B3 | * | 3/2007 | ............. B60R 21/13 |
| DE | 102006002941 | A1 | * | 8/2007 | ............. B60R 21/13 |
| DE | 10 2008 032 503 | A1 | | 1/2010 | |
| DE | 102008041780 | A1 | * | 3/2010 | ............. B60R 21/13 |

(Continued)

OTHER PUBLICATIONS

International Search Report (PCT/ISA/210) issued in PCT Application No. PCT/EP2023/053758 dated May 24, 2023 with English translation (5 pages).

(Continued)

*Primary Examiner* — Keith J Frisby
(74) *Attorney, Agent, or Firm* — Crowell & Moring LLP

(57) ABSTRACT

A vehicle, in particular a convertible, has a body and a rollover protection device. The rollover protection device includes a base, which is fastened to the body, at least one protective profile which is guided on the base in a linearly movable manner such that it extends in the event of a crash, and at least one support element which engages in a gap between the body and base when the protective profile is extended.

12 Claims, 6 Drawing Sheets

(56)         References Cited

FOREIGN PATENT DOCUMENTS

| | | | | | |
|---|---|---|---|---|---|
| DE | 10 2009 052 170 A1 | | 5/2011 | | |
| EP | 0657327 A1 | * | 6/1995 | ............. | F16C 29/02 |
| EP | 657328 A1 | * | 6/1995 | | |
| EP | 0919440 A1 | * | 6/1999 | ............. | B60R 21/13 |
| EP | 0976621 A1 | * | 2/2000 | ............. | B60R 21/13 |
| EP | 2216210 A2 | * | 8/2010 | ............. | B60R 21/13 |
| EP | 2329996 A1 | * | 6/2011 | ............. | B60R 21/13 |
| EP | 1 979 203 B1 | | 11/2013 | | |
| EP | 2998170 A1 | * | 3/2016 | ............. | B60R 21/13 |
| WO | WO-9748579 A1 | * | 12/1997 | ............. | B60R 21/13 |
| WO | WO-2007097641 A1 | * | 8/2007 | ............. | B60R 21/13 |

OTHER PUBLICATIONS

German-language Written Opinion (PCT/ISA/237) issued in PCT Application No. PCT/EP2023/053758 dated May 24, 2023 with English translation (8 pages).
German-language Search Report issued in German Application No. 10 2022 103 930.7 dated Jan. 23, 2023 with partial English translation (10 pages).

* cited by examiner

100

1

VEHICLE, IN PARTICULAR A CONVERTIBLE

BACKGROUND AND SUMMARY

The present invention relates to a vehicle, in particular a convertible, comprising an extendable rollover-protection arrangement.

Extendable rollover-protection arrangements, also referred to as active rollover-protection systems, comprise a vehicle-mounted base, which is fastened on the vehicle body, and also at least one movable part, referred to here as a protective profile, which in the event of a crash extends in the vertical vehicle direction. The vehicle-mounted base is usually fastened on the vehicle body via a screwed connection. In the event of an accident (in the event of a crash), the at least one protective profile moves upward relative to the base until it reaches an end position, in which the protective profile locks in place.

In the event of the vehicle turning over, the protective profile is subjected to corresponding forces which run predominantly in and counter to the direction of travel, in the transverse direction towards the vehicle interior and in the direction of the vehicle floor. The location at which the forces take effect is usually the upper edge of the extended protective profile. In the case of the protective profile being subjected to loading, in particular in the longitudinal and/or transverse direction, the protective profile acts as a bending member. In the case of forces being introduced in the direction of the center of the vehicle, the bending is transmitted to the vehicle-mounted base, which thus pivots in the lower region in the direction of the vehicle body. Since rollover-protection arrangements are installed in the vehicle body in the downward direction from above, a gap should be provided between the base and the vehicle body in order to allow for tolerances in respect of the vehicle body, the rollover-protection arrangement and the installation movement. For the event of a crash, it should be noted that support of the base on the vehicle body takes place only once contact has been made between the base and vehicle body, that is to say as soon as the gap has been breached, as a result of which the absorption of load can be delayed.

The object of the present invention is to provide a vehicle having a vehicle body and a rollover-protection arrangement which, while being straightforward to install and produce, allows the vehicle to operate as safely as possible.

The object is achieved by the features of the independent claim. The dependent claims relate to a preferred configuration of the invention.

The object is thus achieved by a vehicle. The vehicle is, in particular, a convertible. The vehicle comprises a vehicle body and a rollover-protection arrangement. The rollover-protection arrangement, in turn, comprises a base, which is fastened on the vehicle body.

In particular, the base comprises two parallel outer profiles, which are connected at their upper ends via a cross-member. The crossmember here is located in particular parallel to the transverse vehicle axis. The outer profiles are located in particular parallel to the vertical vehicle axis. In the region of the crossmember, the base preferably has a fastening joint on both sides. Via these fastening joints, the base is preferably connected to the vehicle body by means of a screwed connection. In addition, provision is preferably made for the two outer profiles likewise to be connected, in particular screwed, to the vehicle body at their lower ends.

In addition to the above-described base, the rollover-protection arrangement comprises at least one protective profile. The protective profile can also be referred to as an inner profile, since it is preferably located in the interior of the above-described outer profile. In particular, provision is made for a respective protective profile to be arranged in both outer profiles described.

The protective profile is guided in a linearly movable manner on the base so as to be extended in the event of a crash. In particular, an energy-storage device, for example a helical spring, is provided for this purpose, the spring moving the protective profile relative to the base in the event of a crash.

As described in the introduction, a gap is located between the base and the vehicle body, the gap being necessary in view of the tolerances in respect of the vehicle body, base and installation movement. The invention makes provision for the rollover-protection arrangement to have at least one supporting element, which engages in the gap between the vehicle body and base in particular when the protective profile is being extended.

There can be a plurality of gaps between the base and vehicle body. Accordingly, it is also possible to provide a plurality of the supporting elements, which engage in the respective gap between the vehicle body and base in particular when the protective profile is being extended. In particular, at least two gaps are provided, each one between one of the two outer profiles and the vehicle body, wherein a dedicated supporting element is provided for each gap. For the sake of simplicity, the invention will be described hereinbelow with reference to a (single) supporting element in a (single) gap.

The term "engage" should be understood to mean that the supporting element moves into the gap, that is to say into the region between the base and vehicle body. As soon as the supporting element is located in the gap, it preferably butts against the vehicle body. On the opposite side, the supporting element can preferably butt against the base, in particular the outer side of the outer profile. As an alternative, it is also possible for the supporting element, on the one hand, to butt against the vehicle body and, on the other hand, to be prevented by appropriate means from moving back in the direction of the base or into the base. In both cases, the gap between the base and vehicle body is bridged and forces are introduced directly from the base into the vehicle body without any need for the entire base to move for the purpose of bridging the gap.

The supporting element is arranged, in particular, such that it engages in the gap when the protective profile is being extended. This means that, in the event of a crash, the supporting element is moved into the gap directly before, during or after the extending operation of the protective profile. This means that the gap is maintained during installation and during normal operation of the vehicle, wherein the supporting element is not located in the gap and does not contribute to the undesirable development of noise, for example creaking.

The protective profile is guided on the base such that it can be moved linearly in particular parallel to the vertical vehicle axis. "Parallel" here means, in particular, that the protective profile is guided in a linearly movable manner at least with its largest motion vector parallel to the vertical vehicle axis, so that even a slight inclination in relation to the vertical vehicle axis is also considered to be parallel.

The supporting element is preferably designed such that it can be engaged in the gap by way of a motion vector perpendicular to the vertical vehicle axis. In the simplest configuration, the supporting element just moves into the gap perpendicularly in relation to the vertical vehicle axis.

In a preferred embodiment, the movement direction of the supporting element as it engages in the gap, however, is made up of at least two motion vectors, wherein the first motion vector is located perpendicularly in relation to the vertical vehicle axis and the second motion vector is located parallel to the vertical vehicle axis. This means that, rather than it just being possible for the supporting element to move into the gap perpendicularly in relation to the vertical vehicle axis, it can also move, once in the gap, in the horizontal and/or vertical directions, so that, ultimately, the supporting element can have one side butting against the vehicle body and the opposite side butting against the outer side of the base, in particular the outer side of the outer profile.

Depending on the movement kinematics, the supporting element can move along the at least two motion vectors simultaneously, one after the other or at least to some extent simultaneously.

The supporting element is preferably mounted on the base and therefore fastened on the base. In particular, a control track is formed between the supporting element and the base. This control track is formed, in particular, by the supporting element being guided in a track element. This track element is preferably fastened on the base, in particular the outer profile, and has at least one pathway, in which an associated pin is guided. This pin, in turn, is a fixed part of the supporting element. Thus the at least one pin together with the at least one pathway forms the "control track".

The control track is designed, in particular, so that, as described above, it guides the supporting element with the two motion vectors both in a direction perpendicular to the vertical vehicle axis and in a direction parallel to the vertical vehicle axis.

Furthermore, provision is made for the rollover-protection arrangement to comprise at least one triggering spring. The triggering spring is arranged such that its spring force drives the supporting element to engage in the gap.

In particular, the supporting element is held counter to the force of the triggering spring by the retracted protective profile. In the normal state of the vehicle, the triggering spring is therefore subjected to stressing and the protective profile holds the triggering spring in its stressed position.

For example, the supporting element can butt against a stop of the protective profile, as a result of which the supporting element is held in its position and the triggering spring remains under stressing. If, in the event of a crash, the protective profile moves upward, then the stop lifts off from the supporting element and the triggering spring can correspondingly move the supporting element.

The supporting element preferably comprises a clamping region and a guide region; in particular, the supporting element here is formed in one piece. The clamping region is in particular wedge-shaped and is arranged, and designed, so as to engage in the gap. The supporting element is preferably guided, and fastened, on the base via the guide region.

As described, the base preferably has an outer profile, in which the protective profile is mounted in a linearly movable manner. The outer profile preferably has an aperture and the supporting element can be moved through the aperture into the gap. In the initial position, it is possible for the supporting element, in particular by way of its clamping region, either to be seated in this aperture or to be located within the aperture. In both cases, the supporting element is moved through the aperture in the outward direction and therefore into the gap.

In particular, provision is made for the gap described here to be located on the outside—as seen in relation to the vehicle—of the base. Accordingly, the supporting element is arranged so as to engage in a gap located on the outside—as seen in relation to the vehicle—of the base. The gap is particularly preferably located on the outside of the base as seen in relation to the transverse vehicle direction. If use is made of the two parallel outer profiles, which are connected for example via a crossmember, provision is made, in particular, for the left-hand outer profile to contain the supporting element for engaging in a gap which is located to the left of the left-hand outer profile and for the right-hand outer profile to contain the supporting element for engaging in a gap which is located to the right of the right-hand outer profile.

Further specifics, features and advantages of the invention can be gathered from the following description and the figures.

DETAILED DESCRIPTION OF THE DRAWINGS

The following text describes, with reference to FIGS. 1 to 6, a vehicle 100 having a vehicle body 101 and a rollover-protection arrangement 1.

Figure 1:
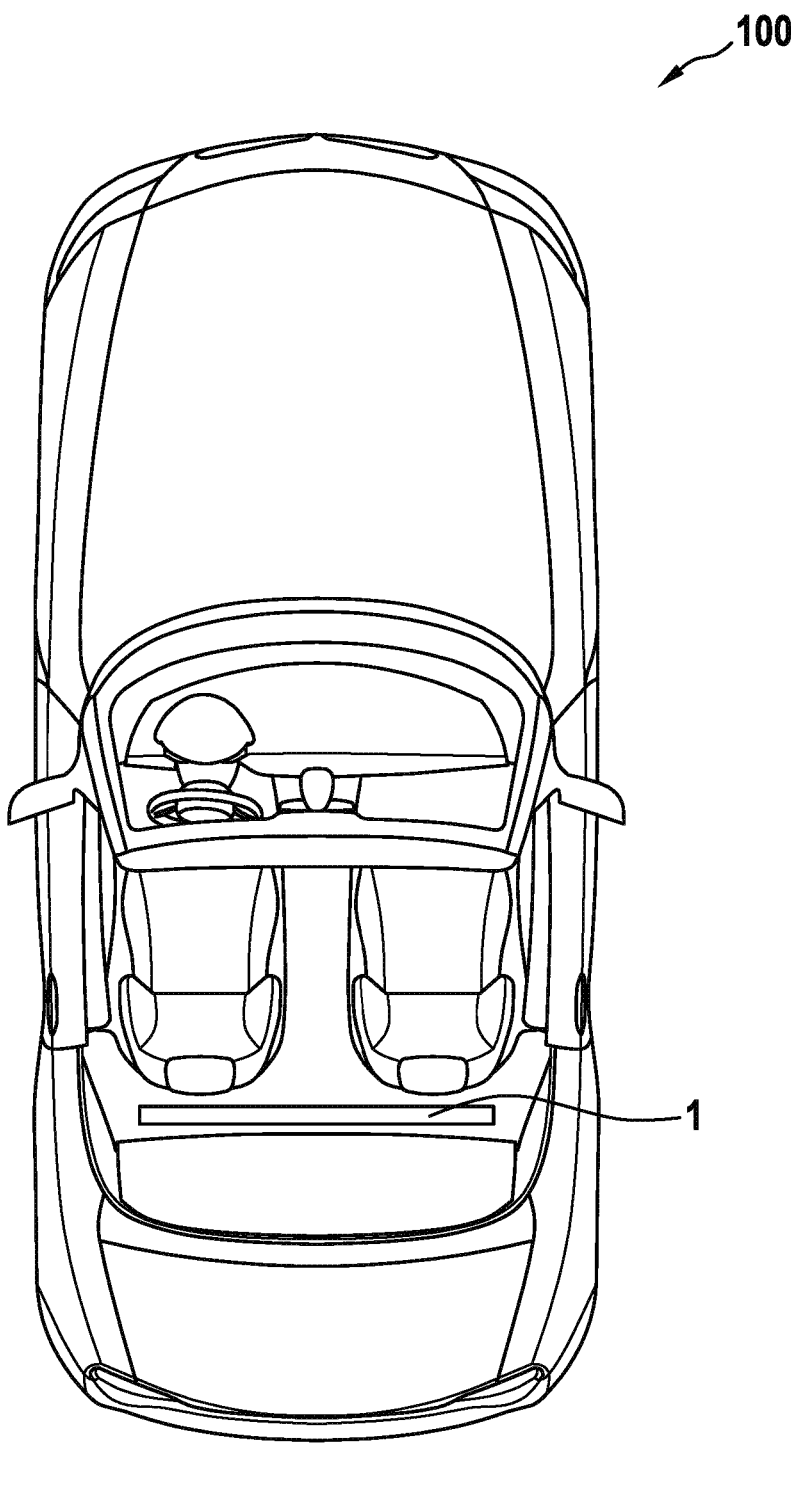
FIG. 1 is a plan view of a vehicle according to the exemplary embodiment of the invention.
Figure 1:
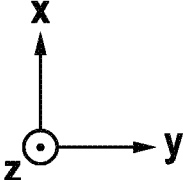

FIG. 1 shows a schematic plan view of the vehicle 100, designed in the form of a convertible. A longitudinal vehicle axis X, a transverse vehicle axis Y and a vertical vehicle axis Z are depicted in accordance with the customary reference terms used for a vehicle.

The rollover-protection arrangement 1 is located in the vehicle 100, usually behind the rear bench-type seat.

Figure 2:
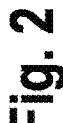
FIG. 2 is a detail of the vehicle according to the exemplary embodiment of the invention having a vehicle body and a rollover-protection arrangement.
Figure 3:
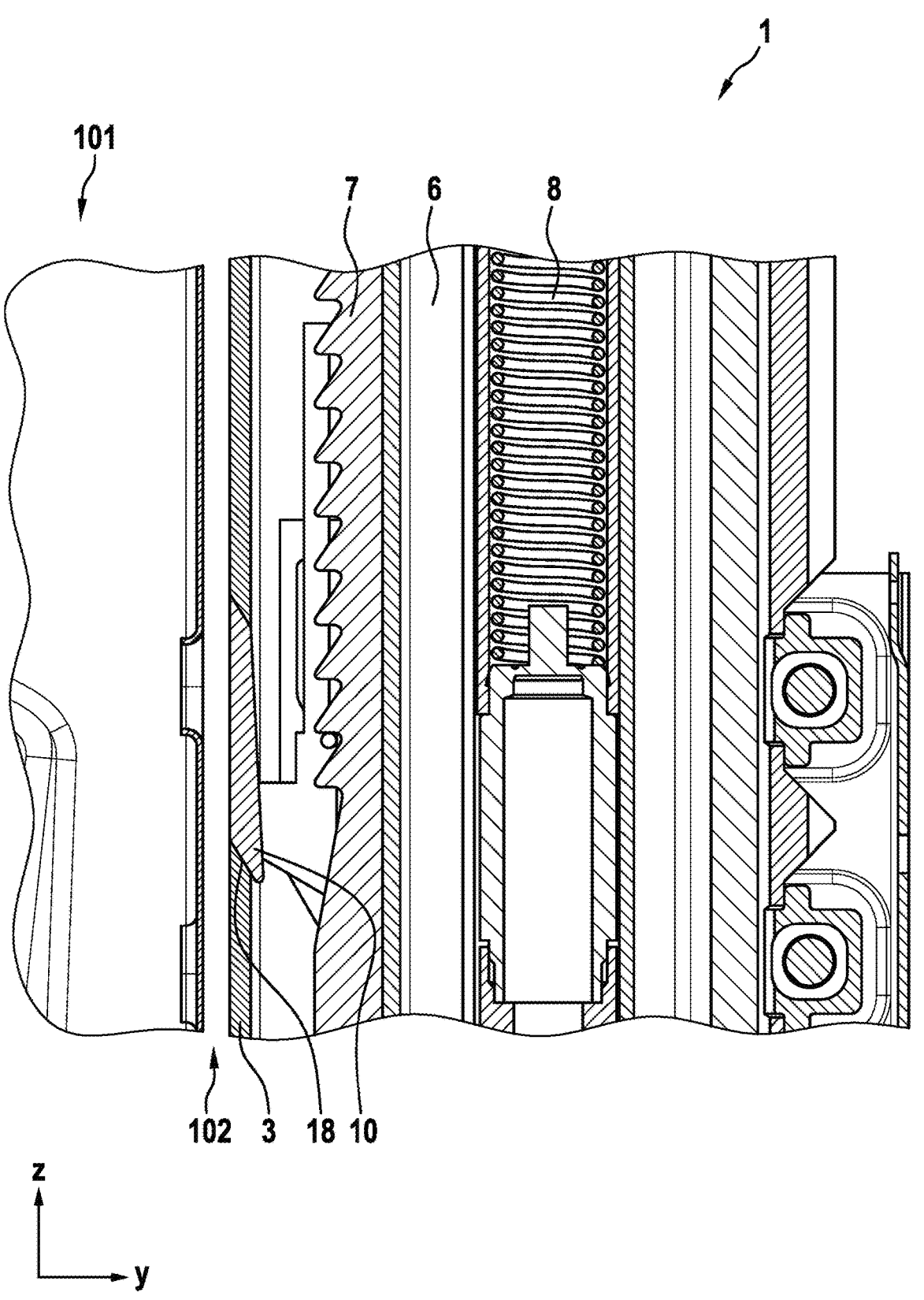
FIG. 3 is a sectional view of the detail III marked in FIG. 2.
Figure 4:
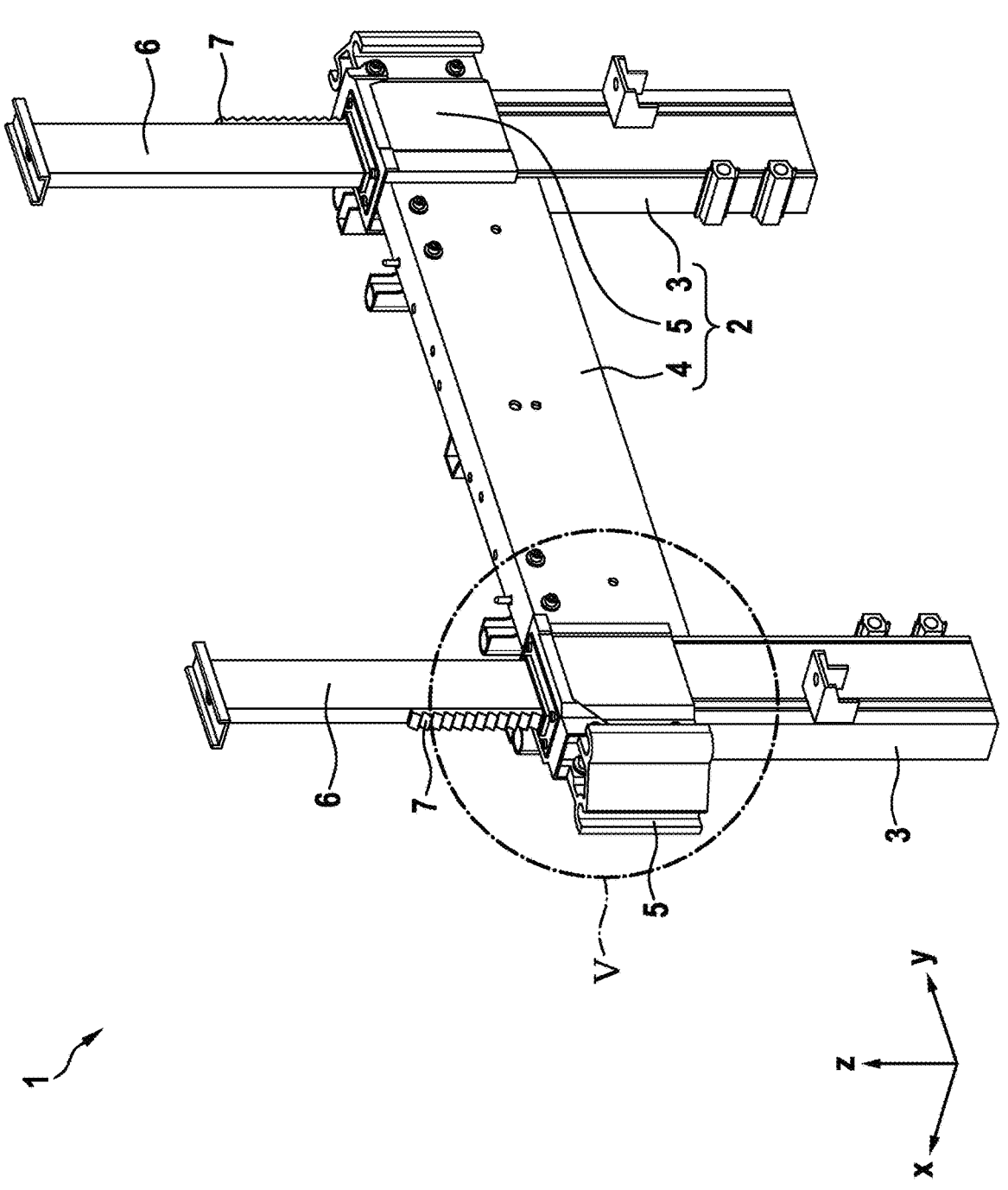
FIG. 4 shows the extended state of the rollover-protection arrangement of the vehicle according to the exemplary embodiment of the invention.
Figure 5:
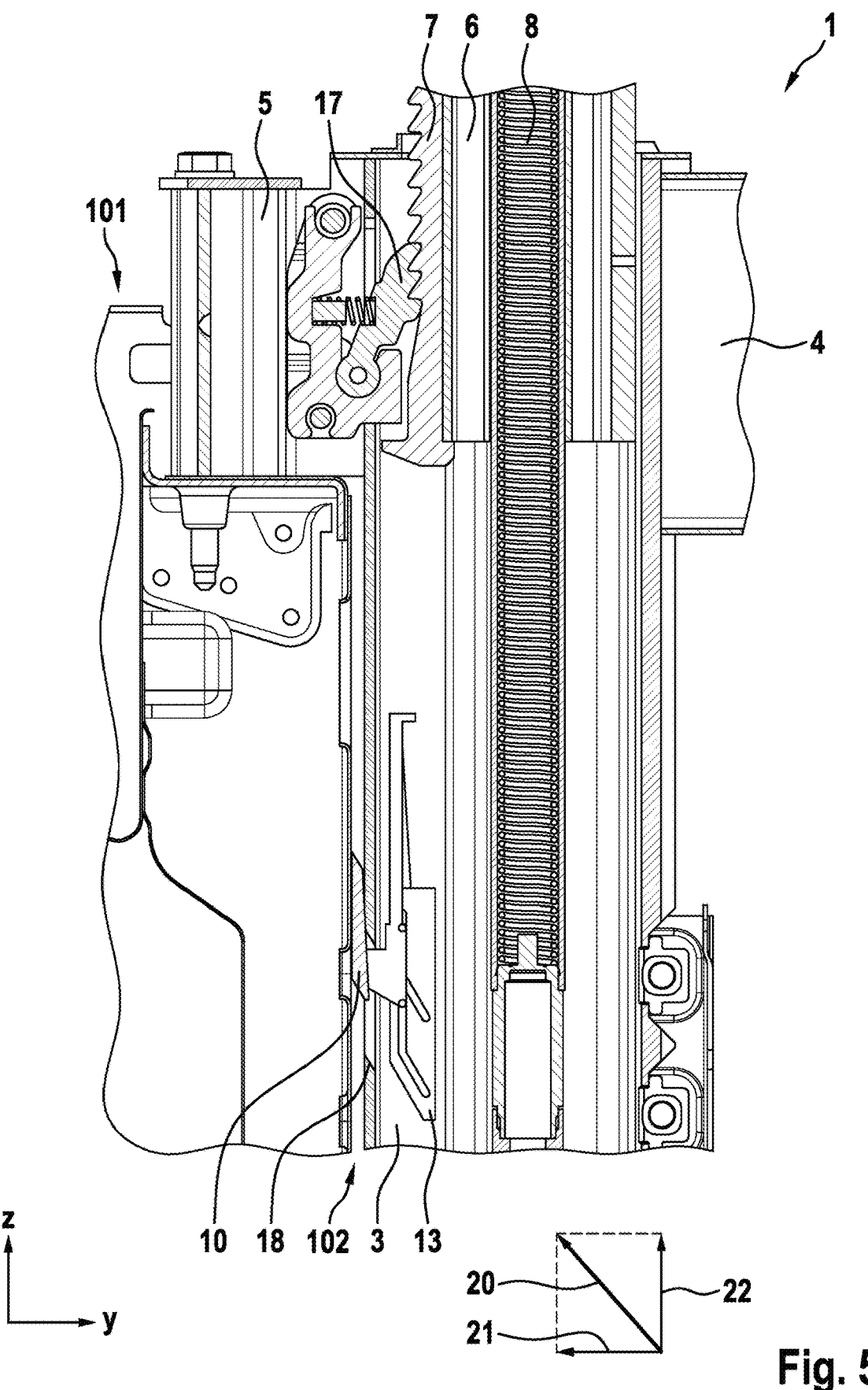
FIG. 5 is a sectional illustration of the detail V marked in FIG. 4.

FIG. 2 shows a detail of the vehicle body 101 of the vehicle 100 with the rollover-protection arrangement 1 fastened therein. As a supplement to this, FIG. 4 shows the rollover-protection arrangement 1 in the extended state, the vehicle body 101 having been omitted from FIG. 4 for the sake of clarity. FIG. 3 shows a sectional view of the detail II marked in FIG. 2. FIG. 5 shows likewise a sectional view of the detail V marked in FIG. 4.

In particular with reference to FIGS. 2 to 5, it can be seen that the rollover-protection arrangement 1 comprises a base 2. The base 2 is made up of two parallel outer profiles 3 and a crossmember 4. The two outer profiles 3 are located essentially parallel to the vertical vehicle axis Z. The crossmember 4 extends essentially parallel to the transverse vehicle axis Y. The base 2 also has two fastening joints 5, which are fastened on the outer profiles 3.

The base 2 is screwed to the vehicle body 101, wherein a gap 102 is provided on the outside—as seen in relation to the vehicle—of the two outer profiles 3.

In addition to the base 2, the rollover-protection arrangement 1 comprises two protective profiles 6, which are guided in a linearly movable manner in the interior of the outer profiles 3. In the event of a crash, the protective profiles 6 can extend out of the base 2 essentially parallel to the vertical vehicle axis Z. Provided for this purpose is an energy-storage device 8 in the form of a helical spring, which is loaded in the initial state of the rollover-protection arrangement 1 and is triggered in the event of a crash.

The respective protective profile 6 has located on it a toothed rack 7, which locks in place in a toothed-rack detent mechanism 17 when the protective profiles 6 extend in the event of a crash.

Figure 6:
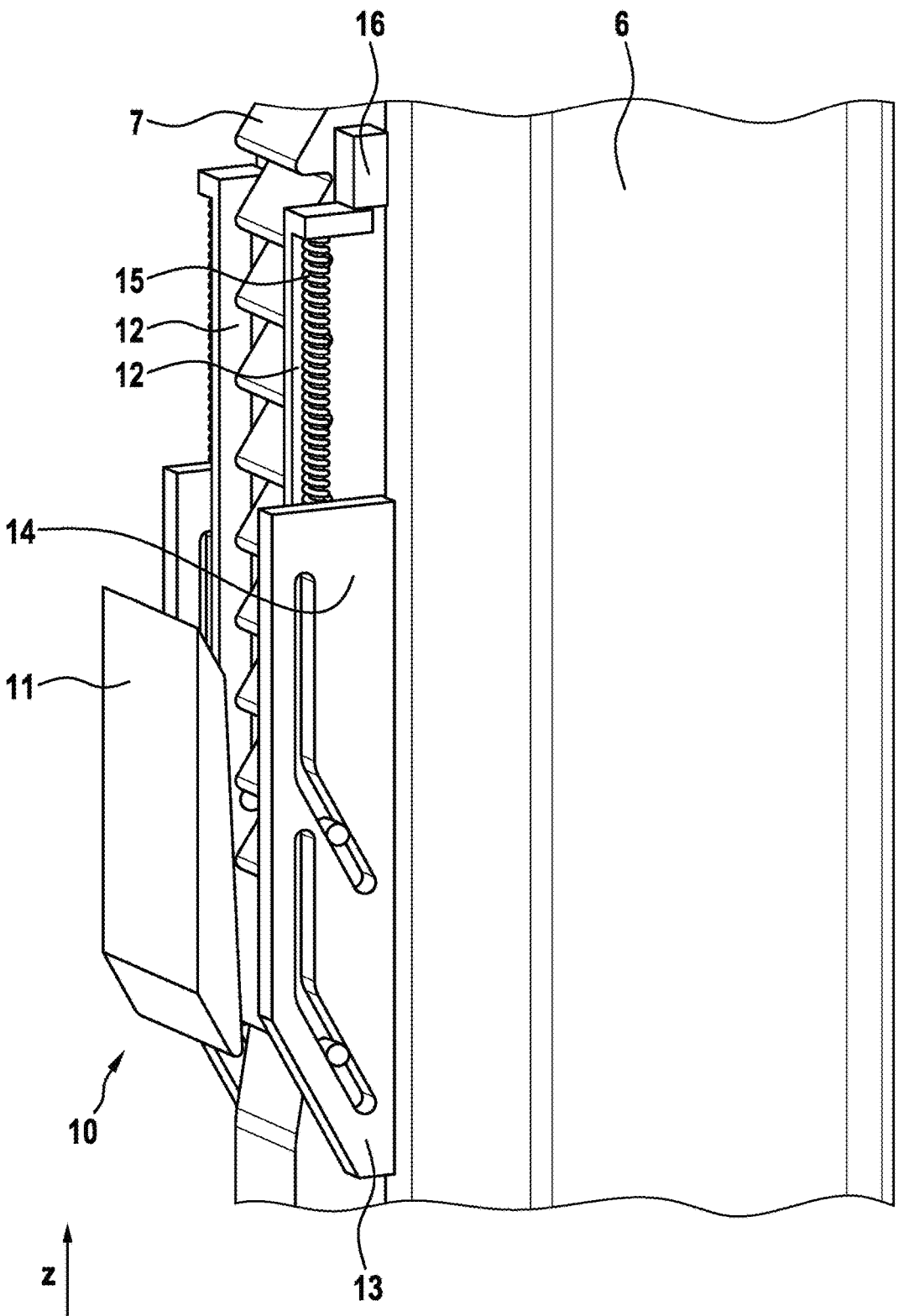
FIG. 6 shows a further detail of the rollover-protection arrangement of the vehicle according to the exemplary embodiment of the invention.

In particular, FIGS. 3, 5 and 6 depict that the rollover-protection arrangement 1 comprises a respective supporting element 10 on the two outer profiles 3. The individual supporting element 10 is made up in one piece of a clamping region 11 and a guide region 12. The clamping region 11 is of wedge-shaped configuration.

Furthermore, a track element 13 is provided for each supporting element 10. This track element 13 is arranged on the base 2, in particular in the interior of the outer profile 3, and is fixed to the outer profile 3. The movable supporting element 10 is fastened, and guided, via the track element 13. To this extent, FIG. 6 shows an illustration in which the outer profile 3 has been omitted, but it is nevertheless possible to see the track element 13, which is fastened on the outer profile 3.

Located on the guide region 12 of the supporting element 10 are pins, which are guided in corresponding pathways of the track element 13. These pathways together with the pins form a control track 14.

The control track 14 is designed such that the supporting element 10 can be moved first of all in the movement direction 20 shown in FIG. 5. This movement direction 20 is made up of a first motion vector 21 perpendicular to the vertical vehicle axis Z and a second motion vector 22 parallel to the vertical vehicle axis Z. This means that the supporting element 10 can be moved outward into the gap 102 and, at the same time, upward.

The configuration of the control track 14 in the exemplary embodiment shown also makes provision so that, following this oblique movement in accordance with the movement direction 20 depicted, the supporting element 10 is guided upward parallel to the vertical vehicle axis Z.

In the exemplary embodiment shown, it is not just possible for the supporting element 10 to engage in the gap 102 by way of a movement perpendicular to the vertical vehicle axis Z; rather, the supporting element is also pushed upward into the gap 102 by way of the movement parallel to the vertical vehicle axis Z, so that, ultimately, one side of the wedge-shaped clamping region 11 butts against the vehicle body 101 and the other side butts against the outside of the outer profile 3.

The pathway of the control track 14 that is shown in FIGS. 5 and 6 can be configured to widen in the upward direction, so that, with tolerances being taken into account, the supporting element 10 always butts, on the one hand, against the vehicle body 101 and, on the other hand, against the outer side of the outer profile 3.

The schematic illustration in FIG. 6 shows that a stop 16 is arranged on the protective profile 6, this stop holding the supporting element 10 down counter to the force of a triggering spring 15. As soon as the protective profile 6 is extended upward in the event of a crash, the stop 16 lifts off from the supporting element 10 and the triggering spring 15 can move the supporting element 10 upward, so that the supporting element 10 moves in accordance with the control track 14.

FIGS. 3 and 5 depict, in the sectional view, that the base 2, in particular the outer profile 3, comprises an aperture 18, through which the supporting element 10 can be moved outward into the gap 102. In the exemplary embodiment shown, the clamping region 11 of the supporting element 10, in the initial state, is seated in this aperture 18 and, in the event of a crash, moves outward and upward.

As an alternative, it is also possible for the supporting element 10 just to be moved perpendicularly in relation to the vertical vehicle axis Z, so that it butts against the vehicle body 101. Appropriate configuration of a track guide or, for example, use of a cam for moving the supporting element 10 can ensure here that the supporting element 10 cannot be pushed back again into the base 2, so that forces can be transmitted to the vehicle body 101 via the supporting element 10.

LIST OF REFERENCE SIGNS 1 rollover-protection arrangement
2 base
3 outer profile
4 crossmember
5 fastening joint
6 protective profile
7 toothed rack
8 energy-storage device
10 supporting element
11 clamping region
12 guide region
13 track element
14 control track
15 triggering spring
16 stop
17 toothed-rack detent mechanism
18 aperture
20 movement direction
21 first motion vector
22 second motion vector
100 vehicle
101 vehicle body
102 gap
X longitudinal vehicle axis
Y transverse vehicle axis
Z vertical vehicle axis.

The invention claimed is:
1. A vehicle, comprising:
a vehicle body; and
a rollover-protection arrangement,
wherein the rollover-protection arrangement comprises:
    a base, which is fastened on the vehicle body;
    at least one protective profile, which is guided in a linearly movable manner on the base so as to be extended in an event of a crash; and
    at least one supporting element, which engages in a gap between the vehicle body and the base when the protective profile is being extended.
2. The vehicle according to claim 1, wherein
the protective profile is guided on the base so as to be movable linearly parallel to a vertical vehicle axis, and
the supporting element is engageable in the gap by way of a motion vector perpendicular to the vertical vehicle axis.

3. The vehicle according to claim 2, wherein the supporting element is additionally engageable in the gap by way of a motion vector parallel to the vertical vehicle axis.

4. The vehicle according to claim 1, wherein the gap is arranged outside of the base as viewed in relation to the vehicle.

5. The vehicle according to claim 1, wherein the supporting element is mounted on the base.

6. The vehicle according to claim 5, wherein a control track is formed between the supporting element and the base.

7. The vehicle according to claim 1, wherein the supporting element is held counter to a force of a triggering spring by the protective profile in a retracted state.

8. The vehicle according to claim 1, wherein the supporting element comprises a clamping region that engages in the gap.

9. The vehicle according to claim 8, wherein the clamping region is wedge-shaped.

10. The vehicle according to claim 1, wherein the base comprises an outer profile, in which the protective profile is mounted in a linearly movable manner, and the outer profile has an aperture and the supporting element is movable through the aperture into the gap.

11. The vehicle according to claim 1, wherein the base comprises two parallel outer profiles, one protective profile being guided in a linearly movable manner in each of the two outer profiles so as to be extended in the event of a crash, wherein a respective supporting element is arranged in or on each outer profile.

12. The vehicle according to claim 1, wherein the vehicle is a convertible vehicle.

* * * * *